(12) United States Patent
Zhang

(10) Patent No.: US 8,612,878 B2
(45) Date of Patent: Dec. 17, 2013

(54) SELECTING ALTERNATE KEYBOARD CHARACTERS VIA MOTION INPUT

(75) Inventor: Eric Zhang, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 74 days.

(21) Appl. No.: 13/250,120

(22) Filed: Sep. 30, 2011

(65) Prior Publication Data

US 2012/0030606 A1 Feb. 2, 2012

Related U.S. Application Data

(63) Continuation of application No. 12/795,508, filed on Jun. 7, 2010.

(51) Int. Cl.
*G06F 3/048* (2013.01)

(52) U.S. Cl.
USPC .......................... 715/773; 715/764; 715/771

(58) Field of Classification Search
USPC .......................................... 715/773, 764, 771
See application file for complete search history.

(56) References Cited

U.S. PATENT DOCUMENTS

| 7,752,569 B2* | 7/2010 | Schultz et al. ................ 715/773 |
| 8,381,137 B2* | 2/2013 | Bradford et al. .............. 715/864 |
| 2002/0167545 A1* | 11/2002 | Kang et al. .................... 345/780 |
| 2003/0014239 A1 | 1/2003 | Ichbiah et al. |
| 2004/0261031 A1* | 12/2004 | Tuomainen et al. ........... 715/739 |
| 2005/0242972 A1* | 11/2005 | Lazaridis et al. ............... 341/22 |
| 2007/0139382 A1* | 6/2007 | Kotipalli ....................... 345/168 |
| 2008/0096610 A1* | 4/2008 | Shin et al. ..................... 455/566 |
| 2009/0058823 A1 | 3/2009 | Kocienda |
| 2010/0085313 A1 | 4/2010 | Rider |

FOREIGN PATENT DOCUMENTS

| KR | 10 2009 0034215 A | 4/2009 |
| KR | 10 2009 0049153 A | 5/2009 |
| KR | 10 2010 0024471 A | 3/2010 |

OTHER PUBLICATIONS

"TouchPal Overview," Accessed Mar. 12, 2010, 5 pp. http://www.cootek.com/intro.aspx.
"What is T+?," Accessed Mar. 12, 2010, 1 pp. http://www.cootek.com/intro-t+.aspx.
"The Fitally Keyboard for the Palm Organizer," Accessed Jul. 7, 2010, 9 pp. http://www.fitaly.com/pilot/palmfitaly.htm.
Isokoski, "Performance of Menu-Augmented Soft Keyboards," CHI, Vienna, Austria, Apr. 24-29, 2004, 8 pp.
U.S. Appl. No. 12/795,508, by Eric Zhang, filed Jun. 7, 2010.
Office Action from U.S. Appl. No. 12/795,508, dated Dec. 27, 2011, 21 pgs.
International Search Report and Written Opinion of the International Search Authority, International Application No. PCT/US2011/039302, dated Jan. 2, 2012 (9 pages).
International Preliminary Report on Patentability and Written Opinion from international application No. PCT/US2011/039302, dated Dec. 20, 2012, 6 pp.

\* cited by examiner

*Primary Examiner* — William Bashore
*Assistant Examiner* — Gregory A Distefano
(74) *Attorney, Agent, or Firm* — Shumaker & Sieffert, P.A.

(57) ABSTRACT

In general, this disclosure describes techniques for selecting alternate keyboard characters via motion input provided by a user. One example method comprises displaying a graphical keyboard via a user interface and receiving, via the user interface, initial user input specifying a selection of a key on the graphical keyboard, wherein the initial user input comprises an initiation of a contact with the user interface. The method further includes displaying alternate characters via the user interface, wherein each alternate character is displayed to indicate at least one corresponding selection direction that is associated with that alternate character, and receiving, via the user interface, additional user input specifying a selection of at least one of the alternate characters, wherein the additional user input comprises motion in the at least one selection direction corresponding to the at least one selected alternate character, and a release of the contact from the user interface.

25 Claims, 13 Drawing Sheets

K1: KEYBOARD 72 (FIG. 4A, FIG. 4B)
K2: KEYBOARD 70 (FIG. 4A, FIG. 4C)
K3: KEYBOARD 74 (FIG. 4A, FIG. 4E)
K4: KEYBOARD 76 (FIG. 4A, FIG. 4D)

| KEY PRESSED | SWIPE UP | SWIPE DOWN | SWIPE LEFT |
|---|---|---|---|
| K1: "q" | K2: "Q" | K3: "1" | K4: "~" |
| K1: "w" | K2: "W" | K3: "2" | K4: "\\" |
| K1: "e" | K2: "E" | K3: "3" | K4: "\|" |
| ⋮ | ⋮ | ⋮ | |
| K1: "g" | K2: "G" | K3: "*" | K4: "^" |
| K1: "h" | K2: "H" | K3: "-" | K4: "_" |
| K1: "j" | K2: "J" | K3: "+" | K4: "=" |
| ⋮ | ⋮ | ⋮ | |

SELECTING ALTERNATE KEYBOARD CHARACTERS VIA MOTION INPUT

This Application is a continuation of U.S. application Ser. No. 12/795,508, filed Jun. 7, 2010, the entire content of which is incorporated herein by reference.

TECHNICAL FIELD

This disclosure relates to processing user input on a computing device, such as a mobile device.

BACKGROUND

In many instances, a user may interact with a computing device to provide manual user input. For instance, a user may use a keyboard, mouse, trackpad, touchpad, or other user interface to provide input during execution of one or more applications on the computing device.

In certain cases, a user may interact with a touchscreen user interface, such as when using a mobile device (e.g., mobile phone, personal data assistant, smart phone, or the like). A mobile device that includes a touchscreen may not necessarily include a separate keyboard device having physical keys. Instead, the mobile device may execute a graphical, or soft, keyboard application that provides a keyboard displayed to the user on the touchscreen. The user may then manually select keys by interacting with (e.g., pressing down on) the touchscreen.

Existing graphical keyboard applications typically require the use of mode keys (e.g., "shift" key, "ctrl" key, "alt" key) in conjunction with an existing key for the input of alternate characters. For example, a user may press the "shift" key and then press the "c" key to input a capital C. In some instances, the user may press three or even more keys (e.g., pressing 'shift' and 'alt' together, and pressing another key) to input certain characters. Some mobile devices allow a user to initiate a 'long press' on a particular letter key to input a capitalized version of the letter. For example, in these devices, the user may press the "c" key for a defined period of time (e.g., one second) to input a capital C.

SUMMARY

In general, this disclosure describes techniques for selecting alternate keyboard characters via receipt of motion input provided by a user. For example, a user may utilize movements (e.g., one or more gestures) to select alternate keyboard characters via a touchscreen of a mobile device, where the alternate characters are selected through interaction with a graphical keyboard that is displayed via a user interface. These techniques attempt to simplify the input of alternate characters in a simple and natural way. Rather than requiring the use of mode keys (e.g., "shift" key, "ctrl" key, "alt" key), which may be difficult for users to input on smaller mobile devices, the techniques may provide for the recognition of user-initiated motion input to select alternate characters.

In one example, a computer-readable storage medium is encoded with instructions that, when executed, cause one or more processors to: display, via a user interface, a graphical keyboard comprising a plurality of keys that are associated with a group of characters; receive, via the user interface, initial user input specifying a selection of a key from the plurality of keys of the graphical keyboard, wherein the initial user input comprises an initiation of a contact with the user interface, and wherein the selected key is associated with a character in the group of characters; display, via the user interface, a plurality of alternate characters in response to receiving the initial user input, wherein each alternate character is displayed to indicate at least one corresponding selection direction that is associated with that alternate character, and wherein at least one of the alternate characters is not included in the group of characters associated with the keys of the graphical keyboard; and receive, via the user interface, additional user input specifying a selection of at least one of the plurality of alternate characters, wherein the additional user input comprises motion in the at least one selection direction corresponding to the at least one selected alternate character, and wherein the additional user input further comprises a release of the contact from the user interface.

In one example, a method comprises the following: displaying a graphical keyboard via a user interface of a computing device, the graphical keyboard comprising a plurality of keys that are associated with a group of characters; receiving, by the computing device via the user interface, initial user input specifying a selection of a key from the plurality of keys of the graphical keyboard, wherein the initial user input comprises an initiation of a contact with the user interface, and wherein the selected key is associated with a character in the group of characters; responsive to receiving the initial user input, displaying a plurality of alternate characters via the user interface, wherein each alternate character is displayed to indicate at least one corresponding selection direction that is associated with that alternate character, and wherein at least one of the alternate characters is not included in the group of characters associated with the keys of the graphical keyboard; and receiving, by the computing device via the user interface, additional user input specifying a selection of at least one of the plurality of alternate characters, wherein the additional user input comprises motion in the at least one selection direction corresponding to the at least one selected alternate character, and wherein the additional user input further comprises a release of the contact from the user interface.

In one example, a computing device comprises one or more processors, a user interface, a display module, and a user interface controller. The display module is operable by the one or more processors to display a graphical keyboard via the user interface, where the graphical keyboard comprises a plurality of keys that are associated with a group of characters. The user interface controller is operable by the one or more processors to receive, via the user interface, initial user input specifying a selection of a key from the plurality of keys of the graphical keyboard, where the initial user input comprises an initiation of a contact with the user interface, and wherein the selected key is associated with a character in the group of characters. The computing device further comprises means for determining a plurality of alternate characters that are to be displayed in response to receiving the initial user input, wherein each alternate character is displayed to indicate at least one corresponding selection direction that is associated with that alternate character, and wherein at least one of the alternate characters is not included in the group of characters associated with the keys of the graphical keyboard. The user interface controller is operable to receive, via the user interface, additional user input specifying a selection of at least one of the plurality of alternate characters, the additional user input comprising motion in the at least one selection direction corresponding to the at least one selected alternate character, and the additional user input further comprising a release of the contact from the user interface.

The techniques of this disclosure may provide one or more advantages. For example, certain techniques may allow a user to select alternate characters (e.g., capital letters, common symbols) using one or more movements/gestures and to reduce the number of keys that are pressed or selected during character entry. The user may not need to utilize various mode keys (e.g., "shift" key, "ctrl" key, "alt" key) or switch between different displayed graphical keyboards in order to select different alternate characters. As a result, in some instances, the GUI may not need to display certain mode keys in certain situations or on certain graphical keyboards, thereby allowing additional screen real estate to display a greater number of other keys directly on one or more of the graphical keyboards.

The details of one or more embodiments of the disclosure are set forth in the accompanying drawings and the description below. Other features, objects, and advantages of the disclosure will be apparent from the description and drawings, and from the claims.

BRIEF DESCRIPTION OF DRAWINGS

FIG. 9 is a diagram illustrating an example mapping mechanism that may be implemented to map user inputs to alternate character selections.

DETAILED DESCRIPTION

Figure 1:
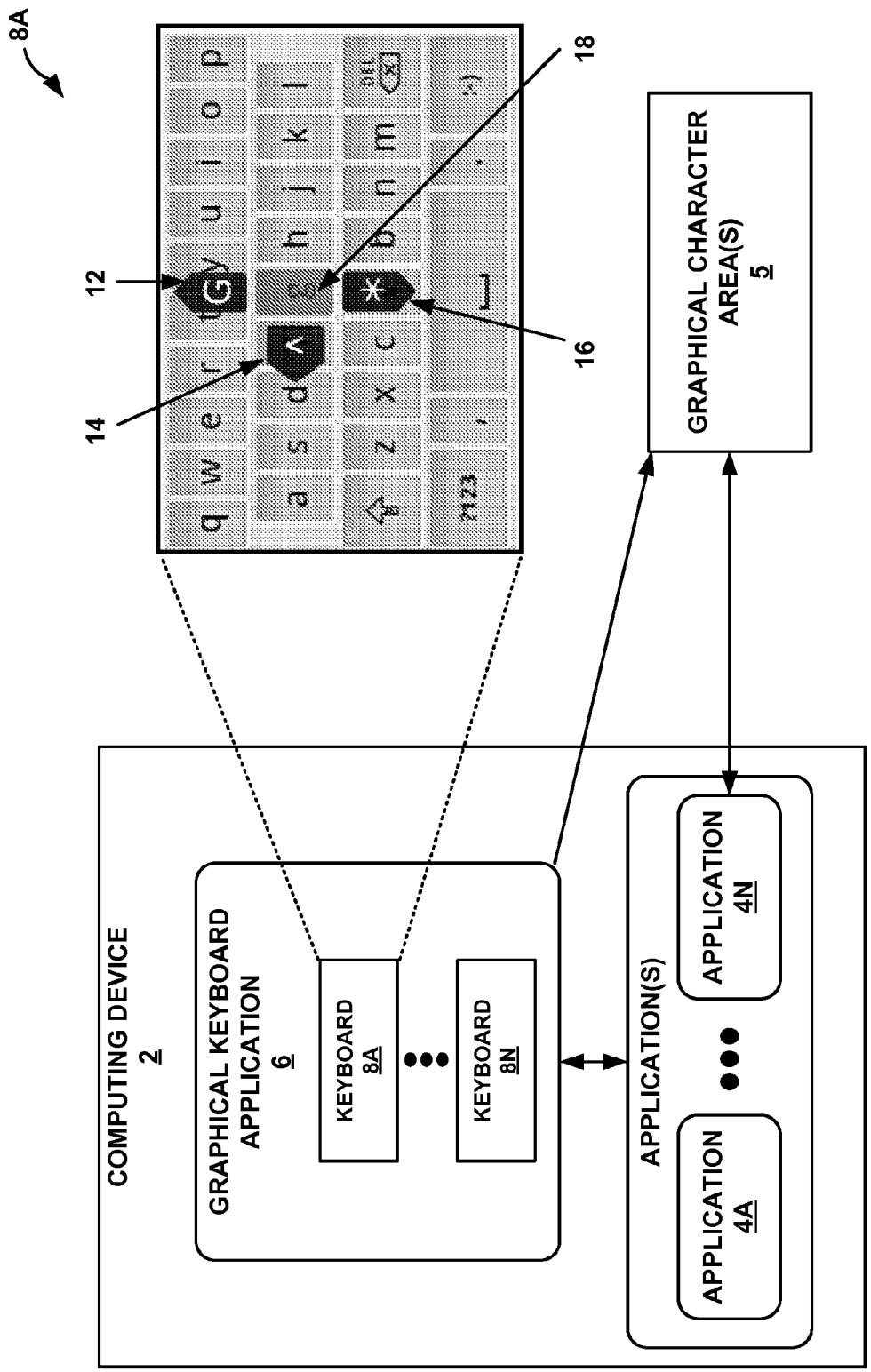
FIG. 1 is a block diagram illustrating an example computing device that may provide a graphical keyboard application in accordance with one or more techniques of the present disclosure.

In general, this disclosure describes techniques for selecting alternate keyboard characters via receipt of motion input provided by a user. For example, a user may utilize movements (e.g., gestures) to select alternate keyboard characters via a touchscreen of a mobile device, where the alternate characters are selected through interaction with a graphical keyboard that is displayed via a user interface. These techniques attempt to simplify the input of alternate characters in a simple and natural way. Rather than requiring the use of mode keys (e.g., "shift" key, "ctrl" key, "alt" key), which may be difficult for users to input on smaller mobile devices, the techniques may provide for the recognition of user-initiated motion input to select alternate characters.

In some examples, a user may be able to press a key on the displayed on-screen, graphical keyboard. After a defined period of time (e.g., 0.5 seconds), the user interface may display one or more graphical display units (e.g., pop-up keys, expanded keys) that include alternate characters that may be entered by the user upon providing motion input (e.g., sliding or swipe gesture) in a particular direction. The graphical display units may display the alternate characters and also provide an indication of the respective directions in which the user is to initiate motion input in order to select these alternate characters.

For example, in one particular scenario, upon user selection of a key on the graphical keyboard, the one or more graphical display units may show three alternate characters that may be input: a first alternate character displayed in an upper position with respect to the selected key; a second alternate character displayed in a lower position with respect to the selected key; and a third alternate character displayed in a left position with respect to the selected key. In some cases, arrows (e.g., up arrow, down arrow, left arrow) may also be displayed to provide an indication of possible motion directions for alternate character input. The display of the alternate keys in this fashion may allow the user to understand that the user may select the first alternate character by providing motion input (e.g., sliding or swipe gesture) upward, the second alternate character by providing motion input downward, and the third alternate character by providing motion input leftward.

Motion input may be provided by the user in any number of different ways. For example, when using device having a touchscreen, the user may physically touch and/or press on the touchscreen and move one or more digits on and across the touchscreen to provide motion input. Alternatively, the user may utilize another object (e.g., stylus) that contacts and moves across the touchscreen to provide motion input. In other cases, the user may provide similar input when using a device that may include another form of user interface (e.g., touchpad, trackpad). In yet other cases, when using a device that may not include a touchscreen, touchpad, trackpad, or similar user interface device, the user may utilize another user interface device (e.g., mouse) to provide motion input that provide similar contact via a user interface to select one or more alternate keyboard characters.

FIG. 1 is a block diagram illustrating an example computing device 2 that may provide a graphical keyboard application 6 in accordance with one or more techniques of the present disclosure. Computing device 2 may comprise one or more stand-alone devices or may be part of a larger system. In certain examples, computing device 2 may comprise a mobile device. For instance, computing device 2 may comprise or be part of a wireless communication device (e.g., wireless mobile handset or device), a video telephone, a digital multimedia player, a personal digital assistant (PDA), a video game console, a laptop computer, or other device. In some instances, computing device 2 may communicate with external, distinct devices via one or more networks (not shown), such as one or more wired or wireless networks, which may, in some cases, provide access to the Internet.

As shown in the example of FIG. 1, computing device 2 may include one or more applications 4A-4N and a graphical keyboard application 6. Applications 4A-4N and graphical keyboard application 6 may be executed by computing device (e.g., by one or more processors included within computing device 2, as described in more detail with respect to FIG. 2).

Each of applications 4A-4N is operable on computing device 2 to perform one or more functions during execution. For example, one or more of applications 4A-4N may comprise a web application that interacts and/or exchanges data with a device that is external to computing device 2. A web application may, in some instances, be executable within a web browser that is operable on computing device 2. Computing device 2 may, in various instances, download or otherwise obtain one or more of applications 4A-4N from an external server via one or more networks (not shown). For instance, a web browser hosted by computing device 2 may download one or more of applications 4A-4N upon access of one or more web sites hosted by such as external server (e.g., web server).

During execution, any of applications 4A-4N may implement, invoke, execute, or otherwise utilize graphical keyboard application 6 as a mechanism to obtain user input that may then be displayed in one or more graphical character areas 5 and provided to the corresponding one or more of applications 4A-4N. For instance, if application 4A is a email application, it may invoke execution of graphical keyboard application 6 to allow a user to enter or type in email text, which may be displayed within graphical character areas 5 (e.g., an email text area) and also provided to application 4A as input. Application 4A may determine the number and/or types of graphical character areas 5 that may be displayed (e.g., an email text area to display email text for an email application).

In another example, if application 4N is a web browser application, it may invoke execution of graphical keyboard application 6 to allow a user to enter Uniform Resource Identifier (URI) information or to provide user input during execution of one or more web applications, which may be displayed in graphical character areas 5 and also provided to application 4N as input. Application 4N may determine the number and/or types of graphical character areas 5 that may be displayed.

In some cases, input received via graphical keyboard application 6 (e.g., from user input via graphical keyboard 8A) may be used to provide display output to graphical character areas 5, and may also be provided to applications 4A-4N. In some cases, input received via graphical keyboard application 6 may be provided to applications 4A-4N, which may provide display output to graphical character areas 5.

Graphical keyboard application 6 may, during execution, display one or more graphical keyboards 8A-8N on computing device 2 to a user. (In this disclosure, the use of "A-N" with respect to different reference numerals should not be understood to imply that there are necessarily an equal number of items for the depicted components. For example, the number of applications 4A-4N is not necessarily equal to the number of graphical keyboards 8A-8N. Instead, the letters "A-N" are used for purposes of illustration only.)

One such example graphical keyboard 8A is shown in FIG. 1. Graphical keyboard 8A includes various different keys that may be selected by a user. In this particular example, graphical keyboard 8A includes keys associated with the characters of the alphabet in lower-case form. In examples where computing device 2 includes a touchscreen user interface, a user may touch or press on a key included within graphical keyboard 8A to select that key for data entry.

Computing device 2 may receive, via a user interface (e.g., touchscreen), initial user input specifying a selection of a key 18 from the plurality of keys of graphical keyboard 8A, wherein the keys are associated with a group of characters displayed by graphical keyboard 8A, and wherein the initial user input includes an initiation of a contact with the user interface. For instance, the initial user input may include an initiation of contact via pressing or touching a touchscreen of computing device 2 to select key 18 of graphical keyboard 8A. The selected key is associated with a character in the group of characters. In the example of FIG. 1, the selected key is associated with the lower-case letter "g."

Computing device 2 may display, via the user interface, a plurality of alternate characters in response to receiving the initial user input, wherein each alternate character is displayed to indicate at least one corresponding selection direction that is associated with that alternate character, and wherein at least one of the alternate characters is not included in the group of characters associated with the keys of the graphical keyboard. In the example of FIG. 1, the alternate characters "G", "^", and "*" are displayed in response to receiving the initial user input that selects key 18. The alternate character "G" is displayed to indicate an upward selection direction that is associated with this alternate character. In FIG. 1, the alternate character "G" is displayed within a graphical display unit 12, which provides an upward arrow. In the example of FIG. 1, none of the alternate characters "G", "^", and "*" are included in the group of characters that are associated with the keys of graphical keyboard 8A.

Similarly, the alternate character "^" is displayed within a graphical display unit 14, which provides a leftward arrow to indicate a leftward selection direction that is associated with this alternate character. The alternate character "*" is displayed within a graphical display unit 16, which provides a downward arrow to indicate a downward selection direction that is associated with this alternate character. In some cases, additional alternate characters associated with one or more other selection directions (e.g., rightward direction, diagonal directions, a sequence of different directions) may also be provided.

Computing device 2 may receive, via the user interface, additional user input specifying a selection of at least one of the plurality of alternate characters (e.g., one of alternate characters "G", "^", or "*"), wherein the additional user input comprises motion in the at least one selection direction corresponding to the at least one selected alternate character, and wherein the additional user input further comprises a release of the contact from the user interface. For example, if the user interface comprises a touchscreen, a user may move (e.g., swipe or slide) a finger in the upward direction across the touchscreen, and then remove the finger from the touchscreen, in order to provide a selection to computing device 2 of the alternate character "G".

Similarly, the user may move the finger in the leftward direction across the touchscreen to provide a selection of the alternate character "^", or may move the finger in the downward direction across the touchscreen to provide a selection of the alternate character "*". In general, the user may move the finger in one or more selection directions to select one or more alternate characters during the input process.

In some cases, the user may utilize another instrument (e.g., stylus) to contact the touchscreen in lieu of a finger. In some cases, computing device 2 may not include a touchscreen. In these cases, keyboard 8A may be displayed to a user on a monitor, and the user may utilize another input device as part of the user interface, such as a mouse, to interact with keyboard 8A. The user may be able to perform similar actions to those described above without the use of a touchscreen. For instance, the user may select key 18 using a first mouse click to initiate contact with the user interface, and may then select alternate character "G" displayed in graphical display unit 12 by dragging the mouse in the upward direction and releasing a mouse button.

The techniques of this disclosure may provide one or more advantages. For example, certain techniques may allow a user to select alternate characters (e.g., capital letters, symbols) using one or more movements/gestures and to reduce the number of keys that are pressed or selected during character entry. The user may not need to utilize various mode keys (e.g., "shift" key, "ctrl" key, "alt" key) or switch between different displayed graphical keyboards in order to select certain alternate characters. As a result, in some instances, the user interface may not need to display certain mode keys in certain situations or on certain graphical keyboards, thereby potentially allowing additional screen real estate to display a greater number of other keys directly on one or more of the graphical keyboards.

Figure 2:
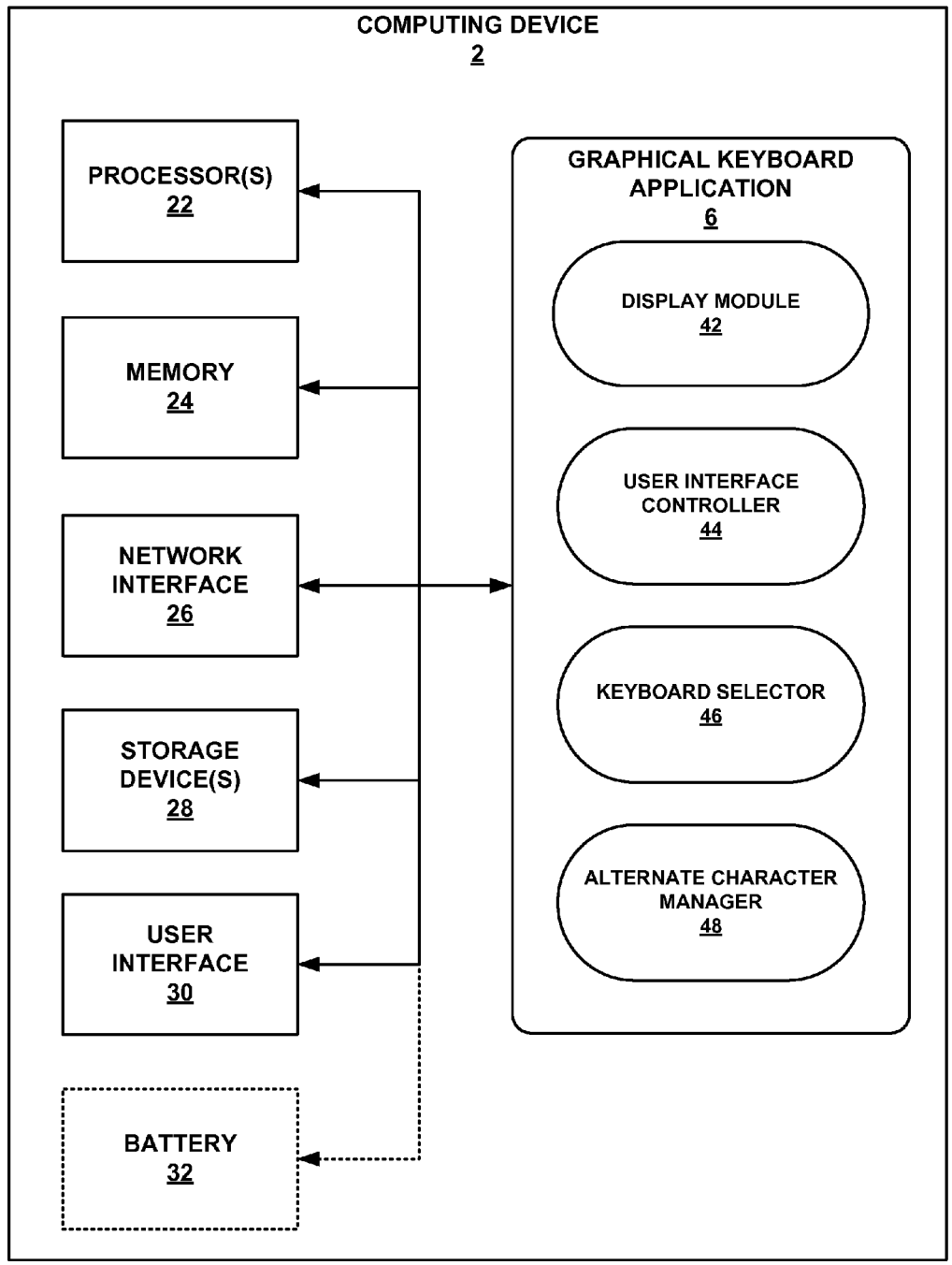
FIG. 2 is a block diagram illustrating further details of one example of the computing device shown in FIG. 1.

FIG. 2 is a block diagram illustrating further details of one example of the computing device 2 shown in FIG. 1. FIG. 2 illustrates only one particular example of computing device 2, and many other example embodiments of computing device 2 may be used in other instances.

As shown in the specific example of FIG. 2, computing device 2 includes one or more processors 22, memory 24, a network interface 26, one or more storage devices 28, user interface 30, and an optional battery 32. For instance, if computing device 2 comprises a mobile device, computing device 2 may include battery 32. Each of components 22, 24, 26, 28, 30, and 32 may be interconnected via one or more busses for inter-component communications. Processors 22 may be configured to implement functionality and/or process instructions for execution within computing device 2. Processors 22 may be capable of processing instructions stored in memory 24 or instructions stored on storage devices 28.

User interface 30 may include, for example, a monitor or other display device for presentation of visual information to a user of computing device 2. User interface 30 may further include one or more input devices to enable a user to input data, such as a manual keyboard, mouse, touchpad, trackpad, etc. In some example, user interface 30 may comprise a touchscreen, which may be used both to receive and process user input and also to display output information. User interface 30 may further include printers or other devices to output information. In various instances in the description contained herein, references made to user interface 30 may refer to portions of user interface 30 (e.g., touchscreen, mouse device) that provide user input functionality.

Memory 24 may be configured to store information within computing device 2 during operation. Memory 24 may, in some examples, be described as a computer-readable storage medium. In some examples, memory 24 is a temporary memory, meaning that a primary purpose of memory 520 is not long-term storage. Memory 24 may also be described as a volatile memory, meaning that memory 24 does not maintain stored contents when the computer is turned off. Examples of volatile memories include random access memories (RAM), dynamic random access memories (DRAM), static random access memories (SRAM), and other forms of volatile memories known in the art. In some examples, memory 24 may be used to store program instructions for execution by processors 22. Memory 24 may be used by software or applications running on computing device 2 (e.g., one or more of applications 4A-4N shown in FIG. 1) to temporarily store information during program execution.

Storage devices 28 may also include one or more computer-readable storage media. Storage devices 28 may be configured to store larger amounts of information than memory 24. Storage devices 28 may further be configured for long-term storage of information. In some examples, storage devices 28 may comprise non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 2 also includes network interface 26. Computing device 2 may utilize network interface 26 to communicate with external devices (e.g., one or more servers, web servers) via one or more networks.

Any applications implemented within or executed by computing device 2 (e.g., applications 4A-4N shown in FIG. 1) may be implemented or contained within, operable by, executed by, and/or be operatively coupled to processors 22, memory 24, network interface 26, storage devices 28, and/or user interface 30.

One example of graphical keyboard application 6 is shown in FIG. 2. Graphical keyboard application 6 may include a display module 42, a user interface controller 44, a keyboard selector 46, and an alternate character manager 48. Graphical keyboard application 6 may provide or display graphical keyboards 8A-8N shown in FIG. 1 (e.g., via user interface 30). Keyboard application 6 may be stored in memory 24 and/or storage devices 30, and may be operable by processors 22 to perform various tasks during execution.

During implementation or execution of keyboard application 6, display module 42 may be operable by processors 22 to display a graphical keyboard (e.g., keyboard 8A) via user interface 30, the graphical keyboard including a plurality of keys. User interface controller 44 may be operable by processors 22 to receive, via user interface 30, initial user input specifying a selection of a key from the plurality of keys of the graphical keyboard, wherein the initial user input comprises an initiation of a contact with user interface 30 (e.g., contact with a touchscreen, contact with a mouse device), and wherein the selected key is associated with a character.

Alternate character manager 48 may be operable by processors 22 to determine a plurality of alternate characters that are to be displayed in response to receiving the initial user input, wherein each alternate character is displayed to indicate at least one corresponding selection direction that is associated with that alternate character (e.g., such as in the example shown in FIG. 1 for keyboard 8A). User interface controller 44 may be operable to receive, via user interface 30, additional user input specifying a selection of at least one of the plurality of alternate characters, the additional user input comprising motion in the at least one selection direction corresponding to the at least one selected alternate character, and the additional user input further comprising a release of the contact from user interface 30 (e.g., release of contact from the touchscreen, release of contact from the mouse device). In some cases, display module 42 may provide the at least one selected alternate character, for purposes of display, to graphical character areas 5 and/or one or more applications (e.g., one or more of applications 4A-4N), but may refrain from providing the character associated with the selected key of the graphical keyboard to graphical character areas 5, such that the character associated with the selected key of the graphical keyboard is not displayed in graphical character areas 5.

Graphical keyboard application 6 may utilize keyboard selector 46 to select the graphical keyboard. For instance, based upon user input, keyboard selector 46 may select one of keyboards 8A-8N for display via display module 42. As one example, a user may initially provide user input to select keyboard 8A, which is shown in FIG. 1. The user may then select the "?123" key of keyboard 8A to select another keyboard that including keys associated with numerical digits (e.g., keyboard 8B). Upon receipt of this user input, keyboard selector 46 may select the chosen keyboard, which may be displayed to the user via display module 42.

In some instances, user interface controller 44 is operable to receive the initial user input and the additional user input via user input provided by one continuous movement while maintaining the contact with user interface 30. Display module 42 may be operable to display each of the alternate characters within a distinct graphical display unit (e.g., within graphical display units 12, 14, 16 shown in FIG. 1). Graphical arrows associated with the distinct graphical display units may indicate the at least one corresponding selection direction associated with each of the alternate characters.

Relative positions of the characters may also indicate the at least one corresponding selection direction associated with each of the alternate characters. For instance, even if graphical display units 12, 14, and 16 didn't have graphical arrows, the relative positions of graphical display units 12, 14, 16 and/or relative positions of the alternate characters "G", "^", and "*" as displayed may indicate the corresponding selection directions.

Display module 42 may be operable to display the alternate characters after the contact with user interface 30 from the initial user input has been maintained for a defined period of time. For instance, if user interface 30 comprises a touchscreen, display module 42 may only display the alternate characters after a user has touched or pressed touchscreen, to select an initial key (e.g., key 18 in FIG. 1) for at least 0.5 seconds.

Figure 3:
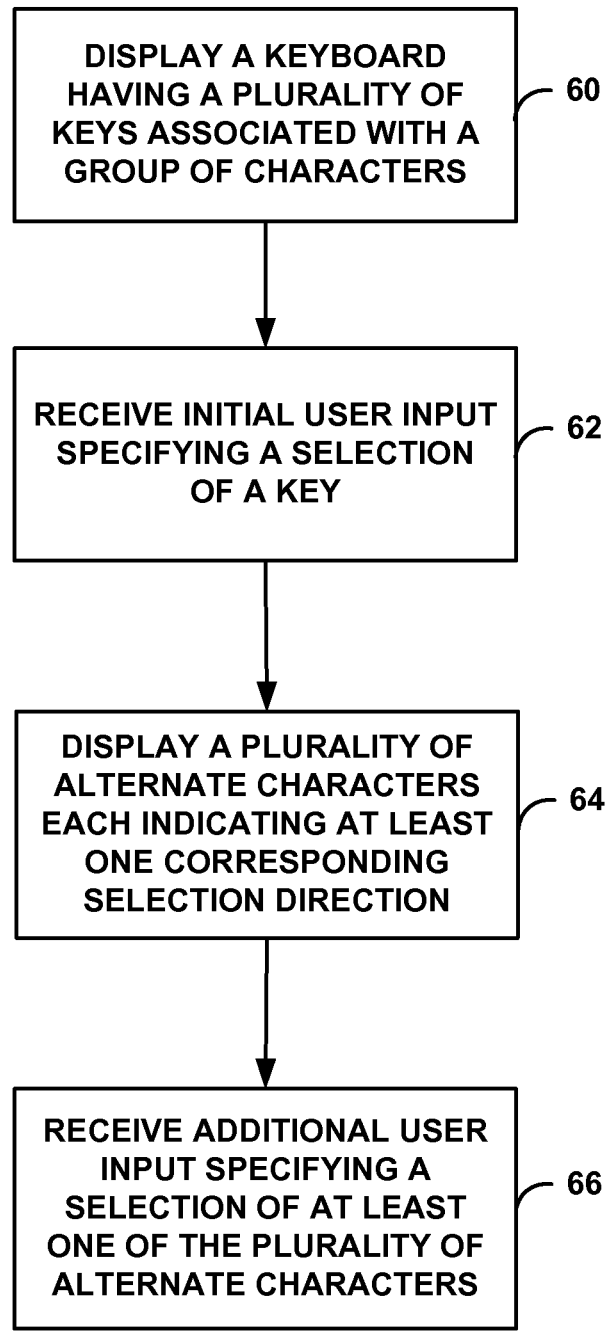
FIG. 3 is a flow diagram illustrating a method that may be performed by a computing device to provide a graphical keyboard application in accordance with one or more techniques of the present disclosure.

FIG. 3 is a flow diagram illustrating a method that may be performed by a computing device to provide a graphical keyboard application in accordance with one or more techniques of the present disclosure. For instance, the illustrated example method may be performed by computing device 2 (FIG. 1). In some examples, a computer-readable storage medium (e.g., a medium included in storage devices 28 of FIG. 2) may be encoded with instructions that, when executed, cause one or more processors (e.g., processors 22) to perform one or more of the acts illustrated in the method of FIGS. 5A-5B.

The method of FIG. 3 includes displaying, via a user interface, a graphical keyboard (e.g., keyboard 8A shown in FIG. 1) comprising a plurality of keys that are associated with a group of characters (60), and receiving, via the user interface, initial user input specifying a selection of a key from the plurality of keys of the graphical keyboard, wherein the initial user input comprises an initiation of a contact with the user interface, and wherein the selected key is associated with a character in the group of characters (62). The method further includes displaying, via the user interface, a plurality of alternate characters (e.g., alternate characters "G", "^", "*") in response to receiving the initial user input, wherein each alternate character is displayed to indicate at least one corresponding selection direction that is associated with that alternate character (64), and receiving, via the user interface, additional user input specifying a selection of at least one of the plurality of alternate characters (66).

At least one of the alternate characters may not be included in the group of characters associated with the keys of the graphical keyboard. In some cases, two or more of the alternate characters are not included in the group of characters associated with the keys of the graphical keyboard. In some cases, each of the alternate characters is not included in the group of characters associated with the keys of the graphical keyboard.

In some examples, the method includes displaying, via the user interface, the at least one selected alternate character in a graphical character area (e.g., one of graphical character areas 5 shown in FIG. 1) that is separate and distinct from the graphical keyboard, and refraining from displaying, in the graphical character area, the character in the group of characters that is associated with the selected key. In these examples, the method includes displaying only the at least one selected alternate character in the graphical area that is separate and distinct from the graphical keyboard.

The additional user input may comprise motion (e.g., with respect to the user interface) in the at least one selection direction corresponding to the at least one selected alternate character, and the additional user input may further comprise a release of the contact from the user interface. In some cases, the method may further include removing the alternate characters from display in response to receiving the additional user input.

Displaying the graphical keyboard may include displaying the plurality of keys such that each key is represented by only a single displayed character within the graphical keyboard. Receiving the initial user input and receiving the additional user input may include receiving user input provided by one continuous movement while maintaining the contact with the user interface. Displaying the alternate characters may include displaying each of the alternate characters within a distinct graphical display unit (e.g., within a distinct one of graphical display units 12, 14, 16 shown in FIG. 1). Graphical arrows associated with the distinct graphical display units may indicate the at least one corresponding selection direction associated with each of the alternate characters. In some cases, relative positions of the alternate characters, with respect to a position of the selected key on the graphical keyboard, may indicate the at least one corresponding selection direction associated with each of the alternate characters. In these cases, graphical arrows associated with the alternate characters may indicate the at least one corresponding selection direction associated with each of the alternate characters.

Displaying the alternate characters on the graphical keyboard may include displaying the alternate characters on the graphical keyboard after the contact with the user interface from the initial user input has been maintained for a defined period of time. The user interface may comprise a touchscreen, and the additional user input may comprise, with respect to the initial user input, at least one sliding movement across the touchscreen in the at least one selection direction corresponding to the at least one selected alternate character.

In some examples, the graphical keyboard may comprise a first graphical keyboard, and a second, different graphical keyboard may comprise a plurality of keys including the selected alternate character. The selected key may be located at a first relative location on the first graphical keyboard with respect to the plurality of keys of the first graphical keyboard, and the at least one selected alternate character may be located at a second relative location on the second graphical keyboard with respect to the plurality of keys of the second graphical keyboard. As will be described more in reference to the example shown in FIGS. 4A-4C, the first relative location on the first graphical keyboard may be substantially the same as the second relative location on the second graphical keyboard.

In some cases, the additional user input may comprise motion in a sequence of different selection directions corresponding to the at least one selected alternate character. For example, if the user interface comprises a touchscreen, the user may move the user's finger along the surface of the touchscreen in a sequence of multiple different directions (e.g., first up, and then left) to select a particular alternate character.

In some cases, the additional user input may specify selections of multiple different alternate characters. For example, continuing with the example above, the user may move the user's finger along the touchscreen in a first direction (e.g., up) to select a first alternate character, and may subsequently move the user's finger in a second, different direction (e.g., left) to select a second, different alternate character. The user may then release the user's finger from contact with the touchscreen.

FIGS. 4A-4E are diagrams illustrating example graphical keyboards 70, 72, 74, and 76, and alternate character selection options, according to one or more techniques of the present disclosure. Any of these graphical keyboards 70, 72, 74, 76 may be displayed (e.g., via user interface 30 of FIG. 2) on a computing device, such as computing device 2. Graphical keyboards 70, 72, 74, 76 may be provided by graphical keyboard application 6 during its execution by computing device 2, according to some examples. Any selected alternate character may be displayed in one or more graphical character areas (e.g., one or more of graphical character areas 5 shown in FIG. 1).

In some cases, the computing device may display only one of keyboards 70, 72, 74, or 76 at any given time via the user interface. A user may select which keyboard is displayed by interacting with the user interface, and a keyboard selector (e.g., keyboard selector 46 of FIG. 2) may select which keyboard is displayed based upon user input.

For instance, the keyboard selector may initially display keyboard 72 to a user via the user interface of the computing device. Keyboard 72 includes keys associated with lower-case letters of the alphabet. The user may press key 90 (FIG. 4B) to select another keyboard 74. Upon pressing key 90 of keyboard 72, the keyboard selector may select keyboard 74 for display via the user interface. However, the user may also press key 88 of keyboard 72 to select keyboard 70. Upon pressing key 88 of keyboard 72, the keyboard selector may select keyboard 70 for display via the user interface.

Keyboard 74 includes keys associated with numbers and other characters. Upon display of keyboard 74, the user may select any of the keys of keyboard 74 for entry of the corresponding characters. If the user presses key 106 (FIG. 4E), the keyboard selector may select keyboard 72 for display via the user interface. If the user presses key 104, the keyboard selector may select keyboard 76 for display, which may then be used for further data entry.

Keyboard 76 includes keys associated with various other miscellaneous characters. Upon display of keyboard 76, the user may select any of the keys on keyboard 76 for entry of the corresponding characters. If the user presses key 104 (FIG. 4D), the keyboard selector may select keyboard 74. If the user presses key 106, the keyboard selector may select keyboard 72.

Keyboard 70 includes keys associated with upper-case letters of the alphabet. Upon display of keyboard 70, the user may select any of the keys on keyboard 70 for entry of the corresponding characters. If the user presses key 88 (FIG. 4C), the keyboard selector may select keyboard 72. If the user presses key 90, the keyboard selector may select keyboard 74.

Figure 4A:
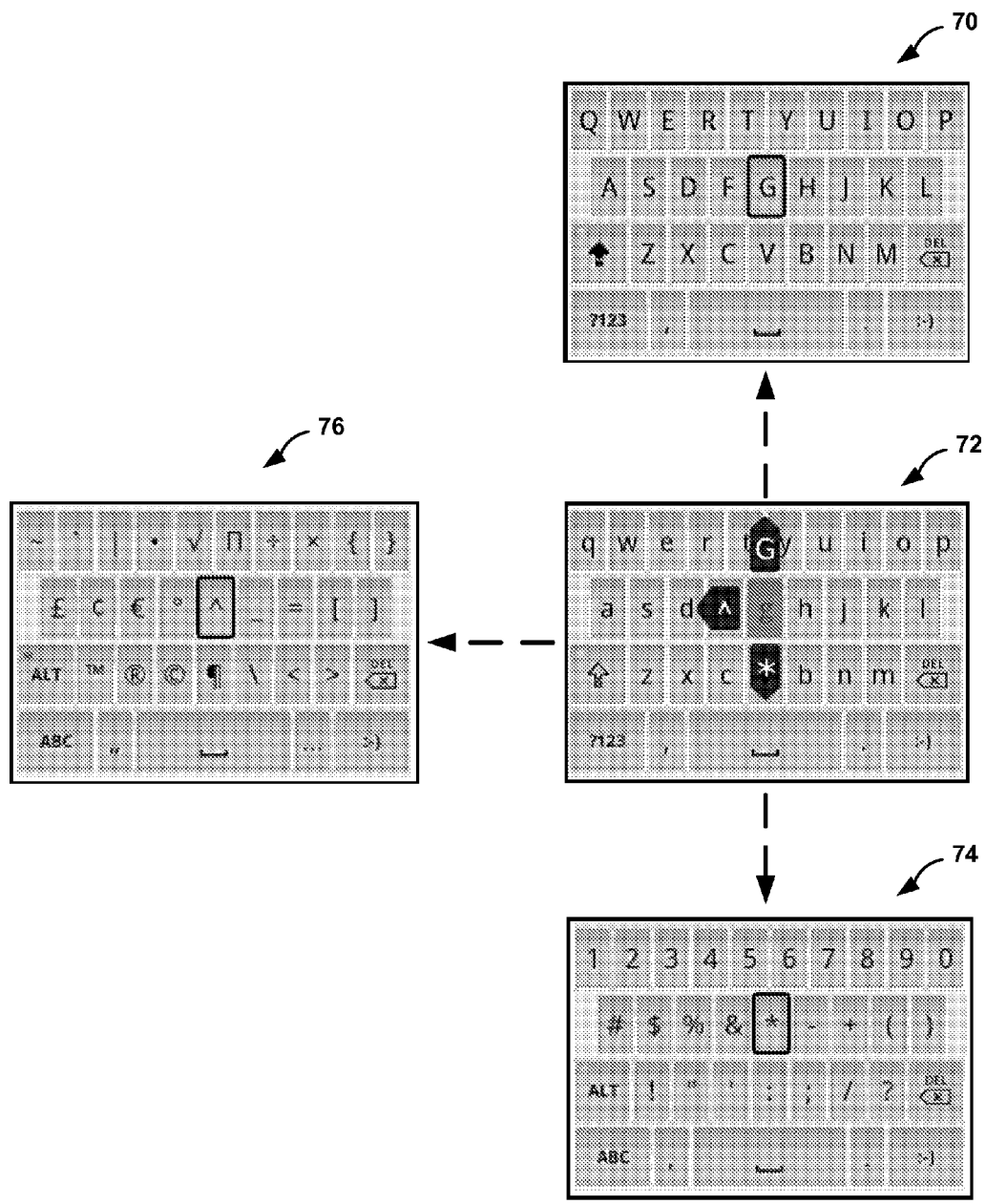
FIGS. 4A-4E are diagrams illustrating example graphical keyboards and alternate character selection options, according to one or more techniques of the present disclosure.

Thus, in such fashion, a user may toggle between various different displayed keyboards 70, 72, 74, and 76 via manual selection of keys included on these keyboards, and may thereby enter various different characters for data entry during execution of an application (e.g., one of applications 4A-4N shown in FIG. 1). However, a user may need to toggle between various of the keyboards 70, 72, 74, and 76 in order to enter certain words, phrases, terms, or the like, which may be somewhat time consuming or burdensome in certain cases, and may required a larger number of keystrokes that are to be provided by the user. As shown in the example of FIG. 4A, keyboards 70, 72, 74, and 76 each include keys associated with characters that are not included in the other keyboards. For example, keyboard 70 includes a key associated with the "G" character, which is a character not included in keyboards 72, 74, or 76. Keyboard 72 includes a key associated with the "g" character, which is a character not included in keyboards 70, 74, or 76. Keyboard 74 includes a key associated with the "*" character, which is a character not included in keyboards 70, 72, or 76. And, keyboard 76 includes a key associated with the "^" character, which is a character not included in keyboards 70, 72, 74.

For instance, during execution of a given application, the user may need to manually enter a password. For purposes of illustration, the password may be "Gia^1*". If keyboard 72 is initially displayed to the user, the user will need to first press key 88 of keyboard 72 to view keyboard 70, and then press key 100 (FIG. 4C) of keyboard 70 to enter the character "G". The user then needs to press key 88 of keyboard 70 to again view keyboard 72, and then press keys 81 and 83 to enter the characters "i" and "a", respectively.

To enter the "^" character, the user presses key 90 of keyboard 72 to view keyboard 74, and then press key 104 of keyboard 74 to view keyboard 76. The user must then press key 102 of keyboard 76 to enter the character "^". The user may then press key 106 of keyboard 76 to return to a view of keyboard 72, and may then press key 85 to enter the character "1". Finally, to enter the character "*", the user must press key 90 of keyboard 72 to view keyboard 74, and then press key 108 of keyboard 74 to enter the character "*".

However, using one or more techniques of the present disclosure, the user may alternatively be able to enter the password "Gia^1*" using only keyboard 72, without the need to toggle between keyboard 72 and the other keyboards 70, 74, and 76 during character entry. For instance, the computing device may receive, via the user interface, initial user input specifying a selection of key 84 (FIG. 4B) of keyboard 72, wherein the initial user input includes an initiation of a contact with the user interface (e.g., with a touchscreen). Key 84 is associated with the lower-case character "g".

Rather than selecting character "g" for purposes of display, however, such as by pressing and quickly releasing key 84 via the user interface, the user may press and hold key 84 for a defined period of time (e.g., 0.5 seconds, or some other amount of time configurable or set by the computing device or by the graphical keyboard application, such as by user interface controller 44 shown in FIG. 2). After pressing and holding key 84 for this defined period of time, the graphical keyboard application may display graphical display units 80, 82, and 86 (e.g., via alternate character manager 48 and/or display module 42). In various embodiments, upon pressing and holding key 84 for the defined period of time, the character "g" associated with key 84 may not be provided for purposes of display in a separate and distinct graphical character area (e.g., one or more of graphical character areas 5).

The computing device may display, via the user interface, alternate characters "G", "^", and "*" in response to receiving the initial user input, wherein each alternate character is displayed to indicate a corresponding selection direction that is associated with that alternate character. For example, alternate character "G" can be displayed in graphical display unit 80 to indicate an upward selection direction associated with this alternate character, given that graphical display unit 80 includes an upward arrow. Alternate character "^" can be displayed in graphical display unit 82 to indicate a leftward selection direction, and alternate character "*" can be displayed in graphical display unit 86 to indicate a downward selection direction.

One, two, or more (e.g., each) of the displayed alternate characters may not be included within the group of characters associated with the keys of graphical keyboard 72. For instance, in the example of FIGS. 4A-4E, none of the displayed alternate characters "G," "^," and "*" are included within the group of characters associated with the keys of graphical keyboard 72.

Upon display of the alternate characters, the computing device may receive, via the user interface, additional user input specifying a selection of one of the alternate characters, wherein the additional user input comprises motion in the selection direction corresponding to the selected alternate character, and wherein the additional user input further comprises a release of the contact from the user interface. For example, if the user interface comprises a touchscreen, the user may select the "G" character for the password by moving (e.g., "swiping") the user's finger along the surface of the touchscreen in the upward direction, which corresponds to the direction associated with graphical display unit 12, and then releasing the user's finger from contact with the touchscreen. In some instances, the user may utilize an apparatus (e.g., stylus) to contact the touchscreen, rather than using the user's finger.

Upon release of the contact from the user interface, the graphical keyboard application may remove graphical display units 80, 82, and 86 from display. The alternate character "G" may, in some cases, be displayed in a graphical character area upon its selection, but the "g" character associated with the initially pressed key 84 may not be displayed in the graphical character area. The user may select the "i" and "a" characters for the password directly within keyboard 72 by pressing keys 81 and 83, respectively.

To select the "^" character of the password, the user may again press and hold key 84 for the defined period of time, at which point the graphical keyboard application may again display graphical display units 80, 82, and 86. The user may select the "^" character by moving the user's finger (or other apparatus) along the surface of the touchscreen in the leftward direction, and then releasing the user's finger (or other apparatus) from contact with the touchscreen. Upon release of the contact, the graphical keyboard application may remove graphical display units 80, 82, and 86 from display. The alternate character "^" may, in some cases, be displayed in the graphical character area upon its selection, but the "g" character associated with the initially pressed key 84 may not be displayed in the graphical character area.

The user may then select the "l" character for password directly within keyboard 72 by pressing key 85. Finally, the enter the "*" character of the password, the user may again press and hold key 84 for the defined period of time, at which point the graphical keyboard application may display graphical display units 80, 82, and 86. The user may select the "*" character by moving the user's finger (or other apparatus) along the surface of the touchscreen in the downward direction, corresponding to graphical display unit 86, and then releasing the user's finger (or other apparatus) from contact with the touchscreen. The alternate character "*" may, in some cases, be displayed in the graphical character area upon its selection, but the "g" character associated with the initially pressed key 84 may not be displayed in the graphical character area.

Using this approach, the user may enter the password "Gia^1*" using only keyboard 72 and various motion (or sliding) gestures to select alternate characters, without having to manually toggle between various different displayed keyboards in order to enter these alternate characters.

Though the user may enter data using keyboard 72 via one or more techniques of the present disclosure, the user may still at any time toggle between any of the other keyboards (e.g., keyboards 70, 74, 76) provided by the keyboard application. It many instances, the keyboard application may provide a set of various different keyboards, such as keyboards 70, 74, 76 that are accessible to the user. In these instances, the keyboard application may manage these keyboards in a hierarchical or layered structure, or layout, for purposes of access and/or storage. Any number of different hierarchical or layered structures may be contemplated.

Figure 4B:
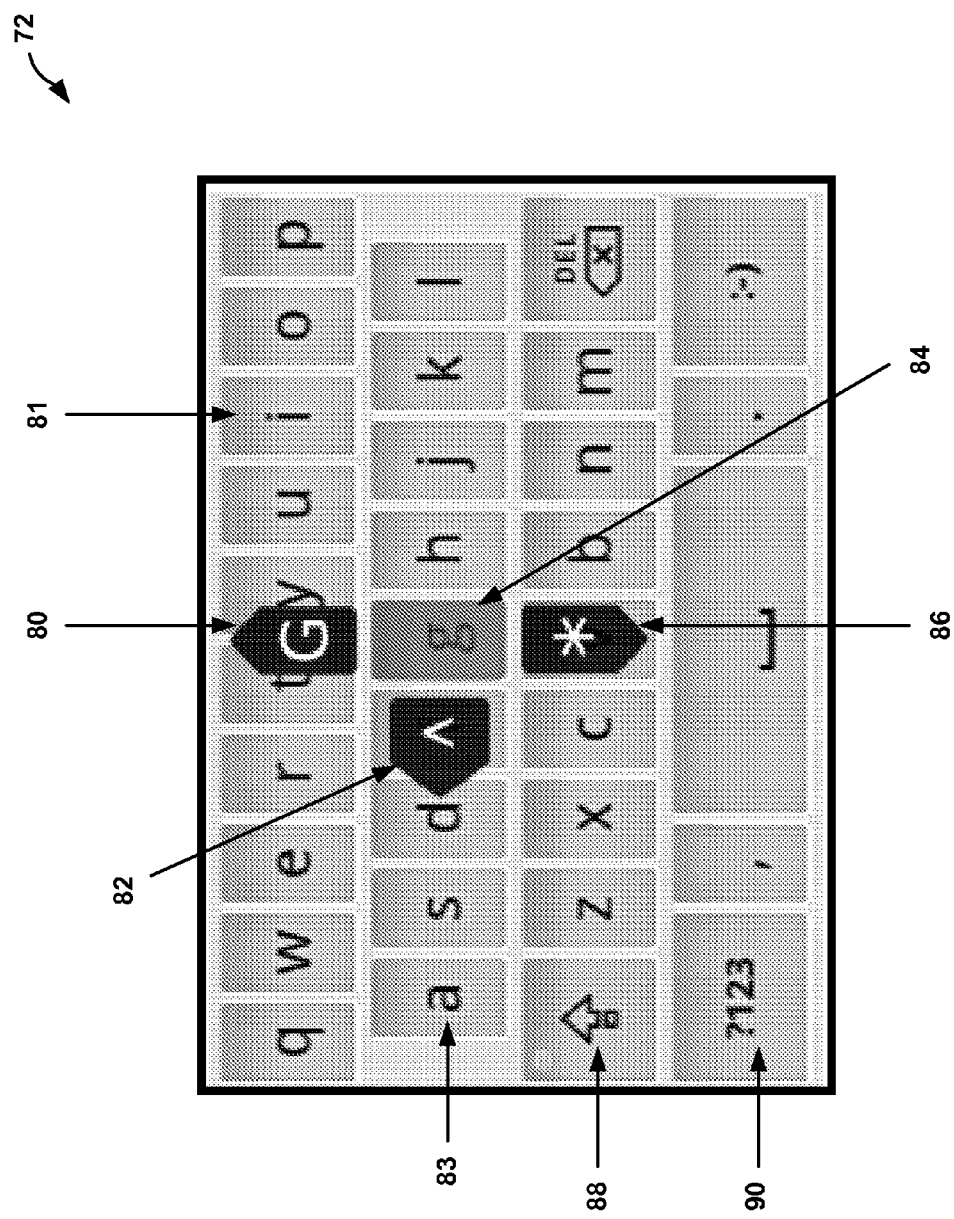
Figure 4C:
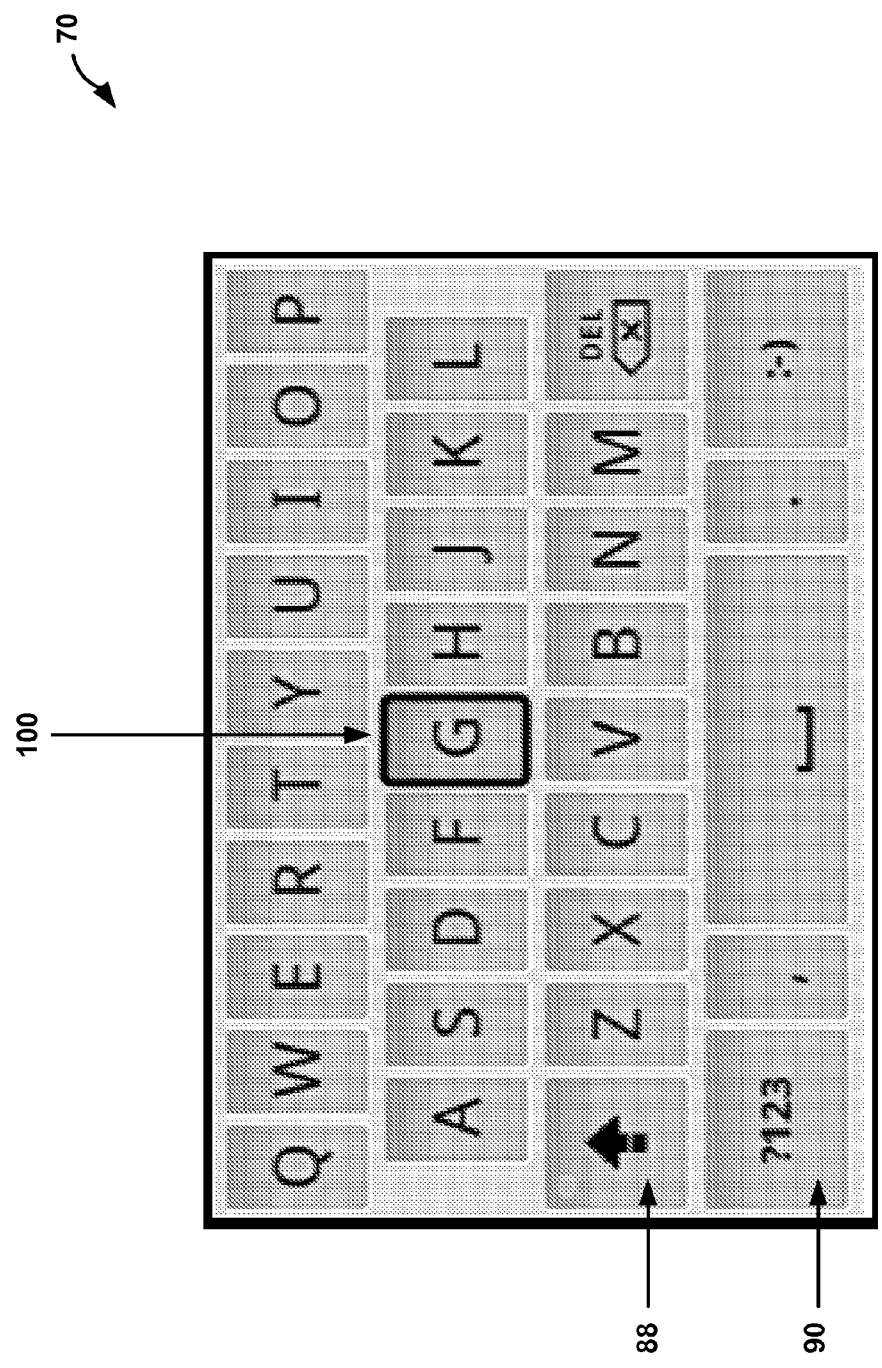
Figure 4D:
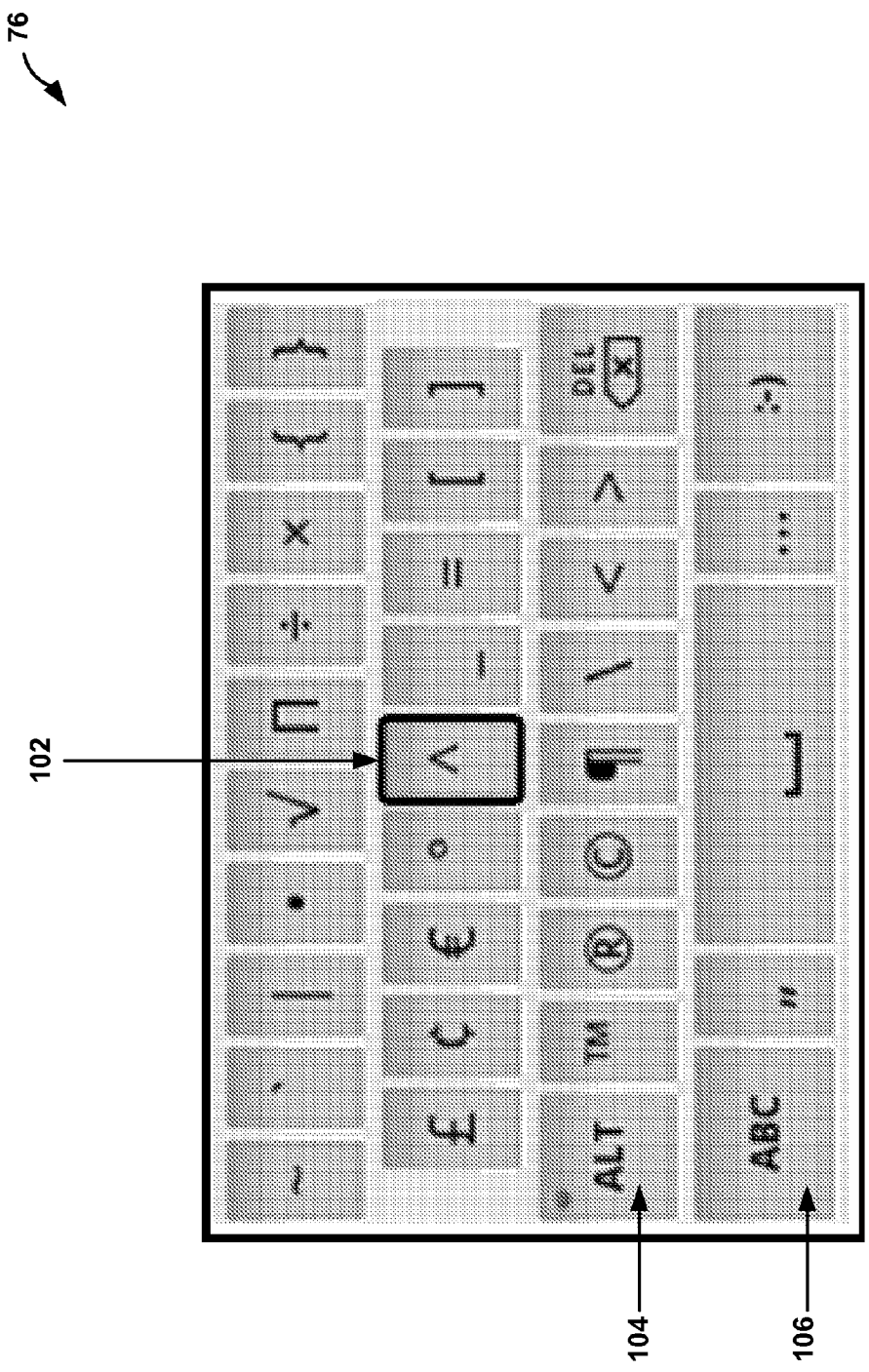
Figure 4E:
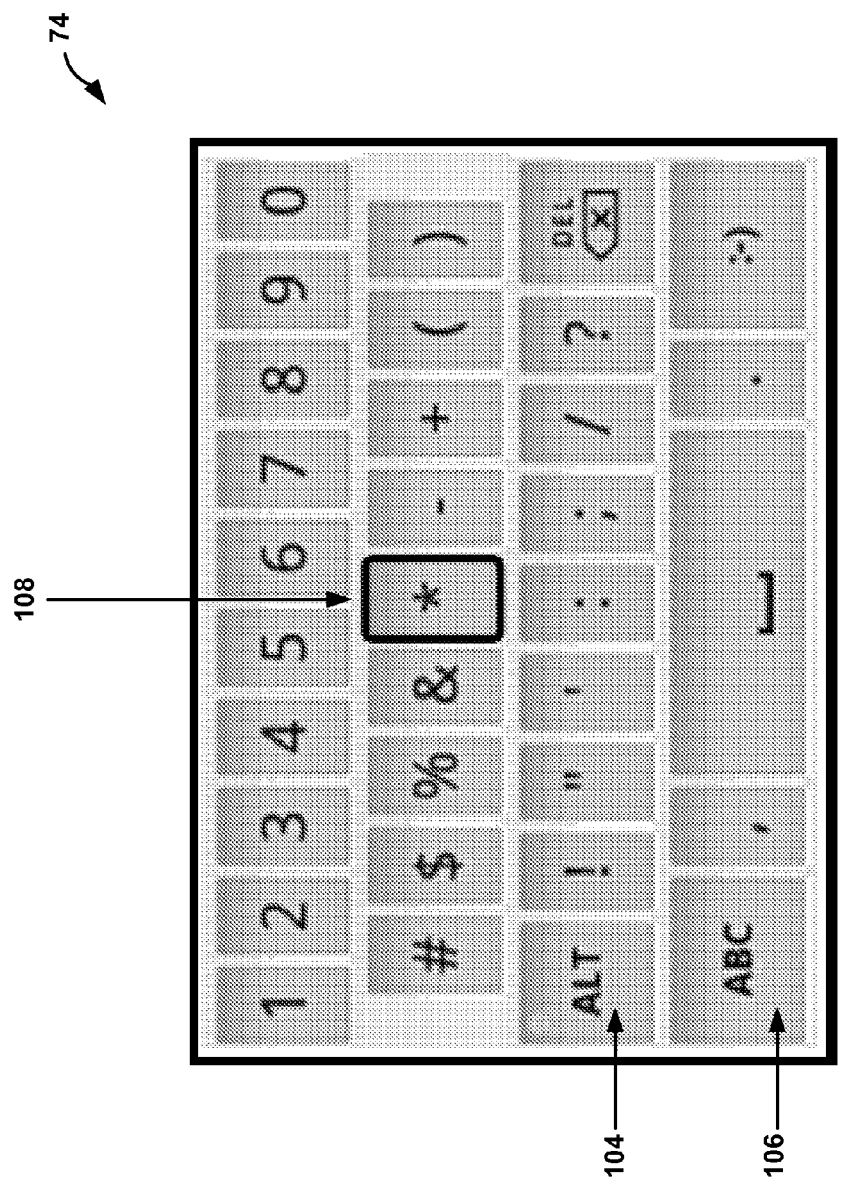

One such structure is shown in the example diagram of FIG. 4A, in which, conceptually, the keyboard application may manage the keyboards 70, 72, 74, and 76 in the indicated structure, or layout. As shown in FIGS. 4A-4C, key 84 occupies the same relative position in keyboard 72 as key 100 occupies in keyboard 70. Similarly, key 84 occupies the same relative position in keyboard 72 as key 102 occupies in keyboard 76. Key 84 also occupies the same relative position in keyboard 72 as key 108 occupies in keyboard 74. As a result, in this example, the alternate characters for keys 100, 102, and 108 are the alternate characters shown in respective graphical display units 80 ("G"), 82 ("^"), and 86 ("*") that are displayed to a user upon the user's pressing key 84 in keyboard 72.

Thus, in this example, because keyboard 76 is located to the "left" of keyboard 72 according the example hierarchical keyboard layout implemented by the keyboard application, graphical display unit 82 provides a leftward selection direction to select the alternate character "^" that is associated with key 102 of keyboard 76. As keyboard 70 is located "above" keyboard 72 according to the example hierarchical layout, graphical display unit 80 provides an upward selection direction to select the alternate character "G" that is associated with key 100 of keyboard 70. As keyboard 74 is located "below" keyboard 72 according to the example hierarchical layout, graphical display unit 86 provides a downward selection direction to select the alternate character "*" associated with key 108 of keyboard 74.

Figure 5:
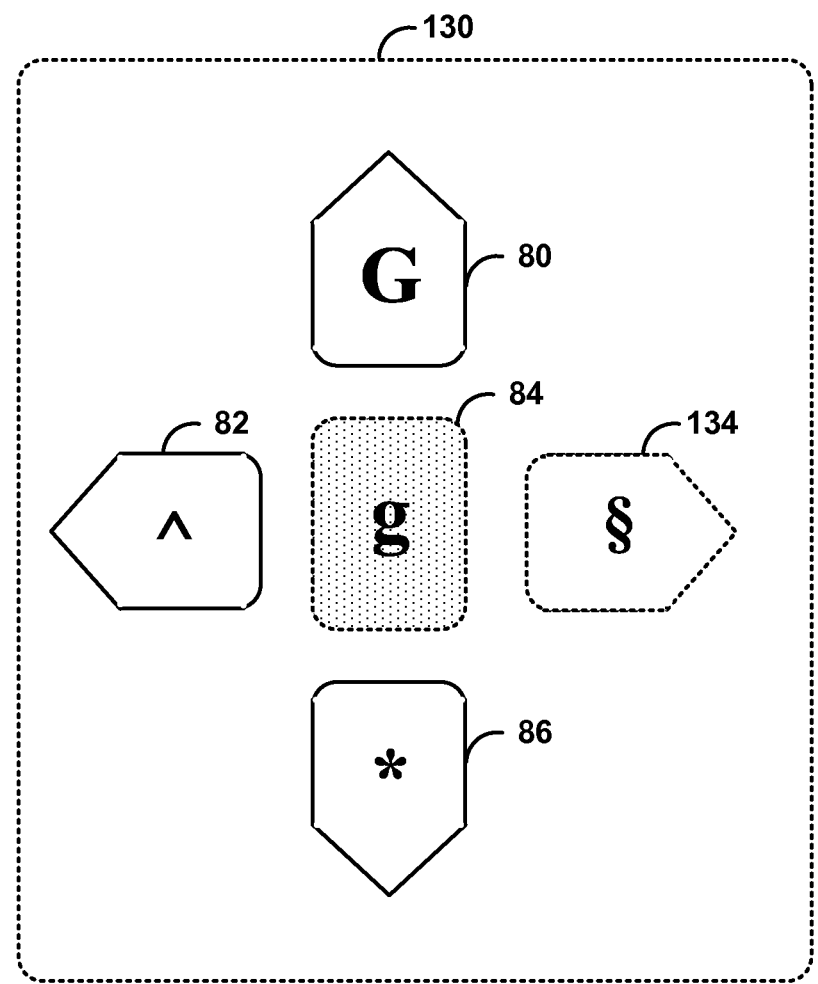
FIG. 5 is a diagram illustrating an example of a manner in which alternate characters may be displayed to a user upon selection of an initial character via a graphical keyboard application.

FIG. 5 is a diagram illustrating an example of a manner in which alternate characters may be displayed to a user upon selection of an initial character via a graphical keyboard application. Similar to the example shown in FIG. 4A, the alternate character "G" is displayed within graphical display unit 80, the alternate character "^" is displayed within graphical display unit 82, and the alternate character "*" is displayed within graphical display unit 86. The user may initially press key 84 for a defined period of time in order to view graphical display units 80, 82, 86. The character "g" associated with key 84 may be optionally displayed. Key 84 and graphical display units 80, 82, and 86 may, in some cases, be optionally displayed within a larger graphical display unit 130.

In addition, though FIG. 4A shows only three graphical display units corresponding to upward, downward, and leftward selection directions, any number of additional graphical display units may also be provided and shown upon a user pressing key 84. These additional graphical display units may correspond to any number of additional directions, including diagonal directions or a sequence of different directions. One such optional additional graphical display unit 134 is shown in FIG. 5. This graphical display unit 134 corresponds to a rightward selection direction. Upon display on this graphical display unit 134, the user may slide or move his/her finger or another apparatus along the display in the rightward direction to select the alternate character "§".

In some cases, user input may comprise motion in a sequence of different selection directions corresponding to at least one selected alternate character. For example, the user may move the user's finger in a sequence of multiple different directions (e.g., up, and left) to select a particular alternate character. Though not shown in the example of FIG. 5, graphical display units corresponding to these multiple different selection directions may be displayed within unit 130. For instance, one or more graphical display units may be displayed to indicate selection directions in the upward and leftward directions, indicating that the user may move the user's finger in a sequence of upward and leftward directions to select a particular alternate character.

In some cases, the user input may specify selections of multiple different alternate characters. For example, in the example of FIG. 5, the user may, in some alternate embodiments, move the user's finger along the touchscreen in a first direction (e.g., up) to select a first alternate character (e.g., "G" shown in graphical display unit 80), and may subsequently move the user's finger in a second, different direction (e.g., left) to select a second, different alternate character (e.g., "^" shown in graphical display unit 82). In some cases, the user may momentarily pause a defined period of time after moving the finger in the first direction, allowing the computing device to recognize a selection of the corresponding first alternate character. The user may then move the finger in the second direction to select the second alternate character, and subsequently release the user's finger from contact with the touchscreen. In such fashion, the user may, in certain cases, be capable of selecting multiple different alternate characters by providing input in multiple different selection directions.

Figure 6:
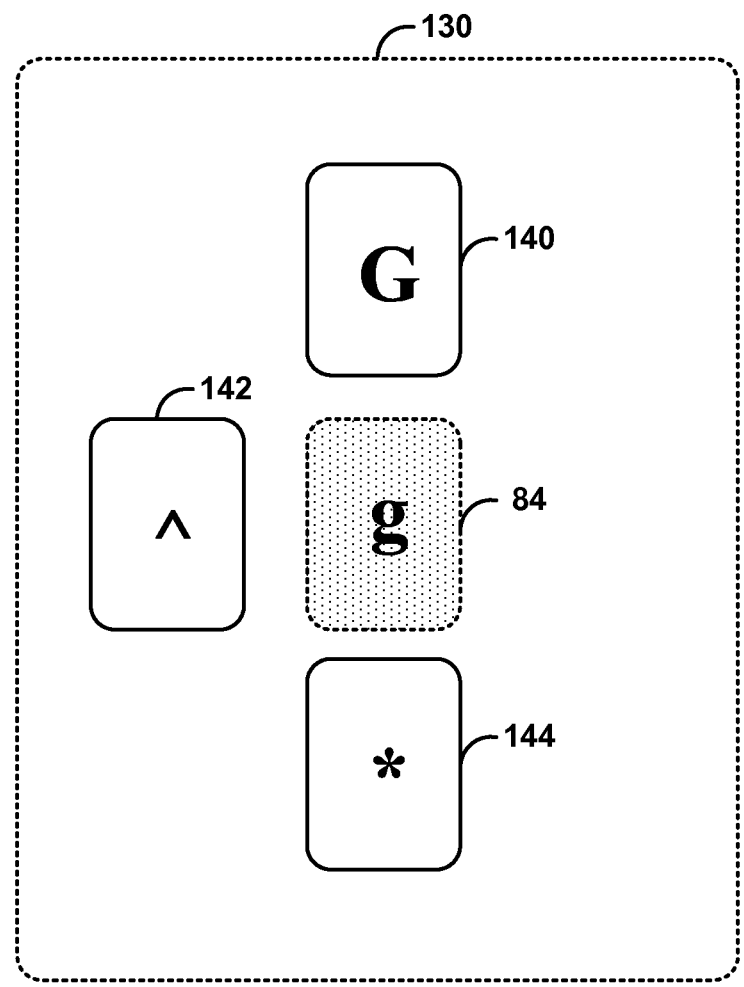
FIG. 6 is a diagram illustrating another example of a manner in which alternate characters may be displayed to a user.

FIG. 6 is a diagram illustrating another example of a manner in which alternate characters may be displayed to a user. The example of FIG. 6 is similar to the example of FIG. 5. Graphical display unit 134 is not included in the example of FIG. 6. In addition, different graphical display units 140, 142, and 144 are displayed in FIG. 6 to display the corresponding alternate characters "G", "^", and "*". Unlike graphical display units 80, 82, and 86, graphical display units 140, 142, and 144 do not include graphical arrows to indicate selection directions. Rather, in the example of FIG. 6, the relative positions of graphical display units 140, 142, and 144, with respect to a position of key 84 on the graphical keyboard, to provide an indication to a user of the corresponding selections directions for the respective alternate characters.

Thus, graphical display units 140, 142, and 144 may be displayed responsive to a user pressing key 84 for a defined period of time. Graphical display unit 140 is displayed above key 84, indicating an upward selection direction to select the alternate character "G". Graphical display unit 142 is displayed to the left of key 84, indicating a leftward selection direction to select the alternate character "^". Graphical display unit 144 is displayed below key 84, indicating a downward selection direction to select the alternate character "*".

Figure 7:
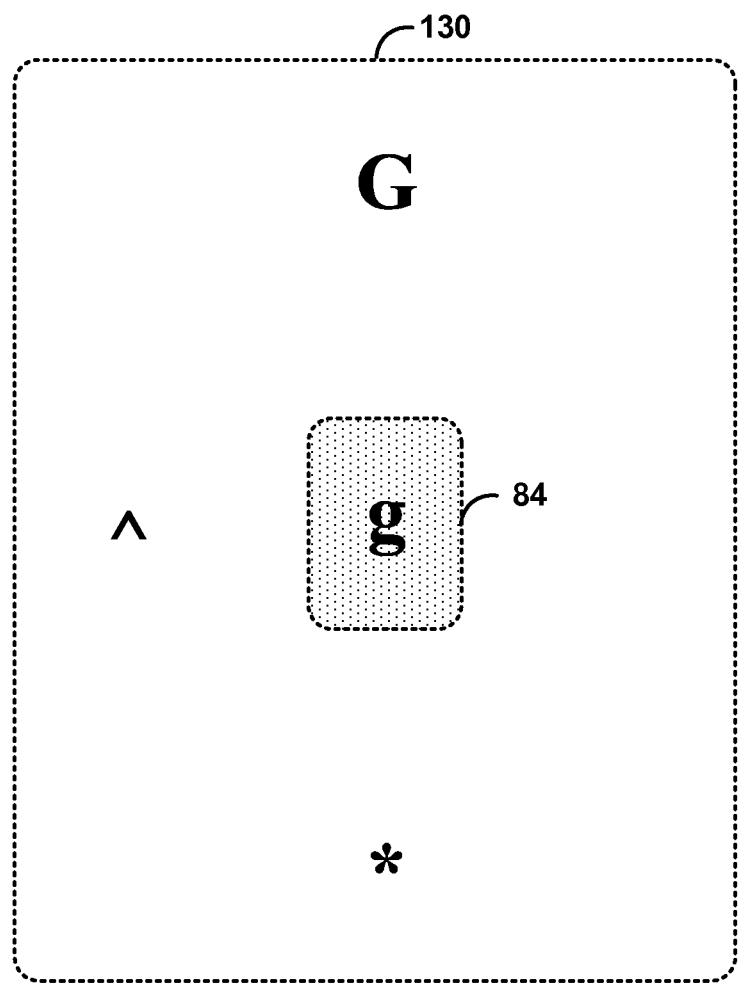
FIG. 7 is a diagram illustrating yet another example of a manner in which alternate characters may be displayed to a user.

FIG. 7 is a diagram illustrating yet another example of a manner in which alternate characters may be displayed to a user. In contrast to the example of FIG. 6, the alternate characters "G", "^", and "*" are not displayed within distinct graphical display units. Instead, the alternate characters themselves are displayed relative to key 84 after a user has pressed key 84 for a defined period of time. Similar to the example of FIG. 6, however, the relative positions of the displayed alternate characters with respect to key 84 indicate the corresponding selection directions for the respective alternate characters.

Figure 8:
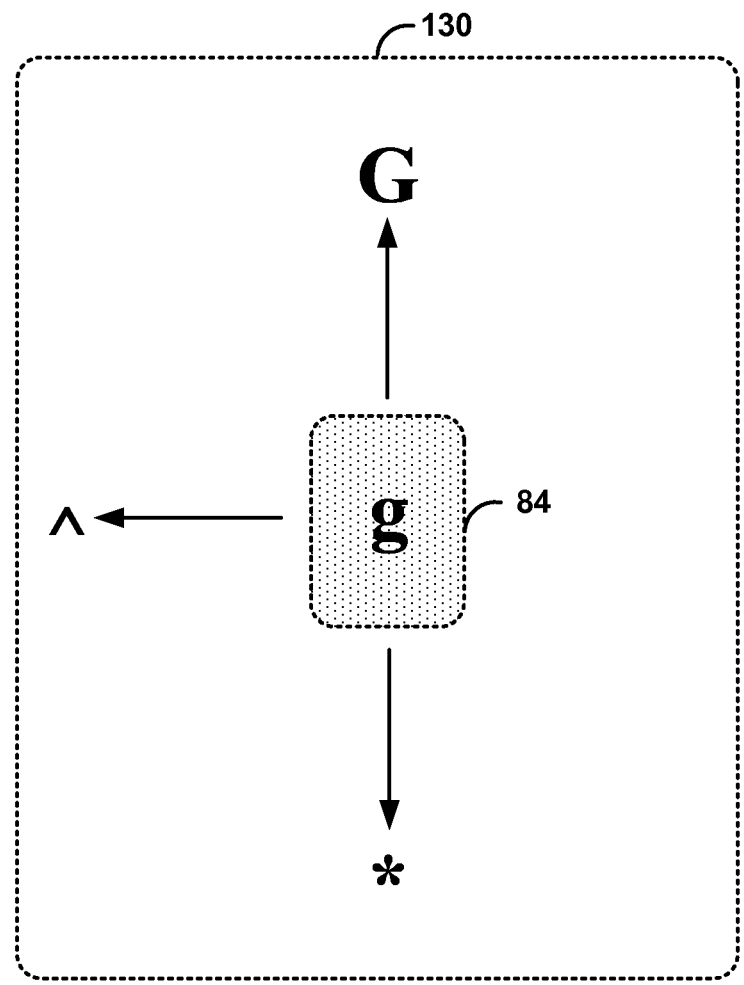
FIG. 8 is a diagram illustrating yet another example of a manner in which alternate characters may be displayed to a user.

FIG. 8 is a diagram illustrating yet another example of a manner in which alternate characters may be displayed to a user. The example of FIG. 8 is similar to the one of FIG. 7, though additional directional arrows are show to indicate selection directions for the associated alternate characters "G", "^", and "*". In the example of FIG. 8, the alternate characters are not displayed or included within separate graphical display units, such as in the examples of FIGS. 4A, 5, and 6. However, graphical arrows indicate to a user that the user may select the alternate character "G" by initiating motion in the upward direction (e.g., sliding or moving a finger along the surface of a touch screen upwards) after initially selecting key 84. The user may select the alternate character "^" by initiating motion in the leftward direction, and may select the alternate character "*" by initiating motion in the downward direction. As noted previously, any number of different selection directions and corresponding graphical arrows may be contemplated or provided in different examples, including diagonal or zig-zag selection directions. FIG. 8 provide but just one non-limiting example.

FIG. 9 is a diagram illustrating an example mapping mechanism that may be implemented to map user inputs to alternate character selections. In some aspects, a graphical keyboard application (e.g., keyboard application 6 shown in FIGS. 1 and 2) may utilize an alternate character manager (e.g., alternate character manager 48 shown in FIG. 2) to map user inputs to alternate character selections using a mapping mechanism, such as the one shown in FIG. 9.

The example of FIG. 9 shows an example table 150 that may be utilized to map user inputs to alternate character selections. The first column of table 150 ("KEY PRESSED") includes, in each row, a particular key that may be pressed on a particular graphical keyboard, such as one of keyboards 72, 70, 74, or 76 shown in FIGS. 4A-4E. In the example of FIG. 9, the identifier "K1" identifies keyboard 72 shown in FIGS. 4A and 4B. The identifier "K2" identifies keyboard 70 shown in FIGS. 4A and 4C. The identifier "K3" identifies keyboard 74 shown in FIGS. 4A and 4E. The identifier "K4" identifies keyboard 76 shown in FIGS. 4A and 4D.

The column labeled "SWIPE UP" includes, in each row, a particular alternate character that may be selected by a user when the user initiates motion (e.g., swipes a finger or another object) in the upward direction after first pressing the corresponding key indicated in the first column ("KEY PRESSED"). For example, table 150 indicates that a user may select the alternate character "G" by first pressing the key "g" on keyboard 72 ("K1") and then swiping in the upward direction, where the alternate character "G" is included in keyboard 70 ("K2").

The column labeled "SWIPE DOWN" includes, in each row, a particular alternate character that may be selected by a user when the user initiates motion in the downward direction after first pressing the corresponding key indicated in the first column ("KEY PRESSED"). For example, table 150 indicates that a user may select the alternate character "*" by first pressing the key "g" on keyboard 72 ("K1") and then swiping in the downward direction, where the alternate character "*" is included in keyboard 74 ("K3").

The column labeled "SWIPE LEFT" includes, in each row, a particular alternate character that may be selected by a user when the user initiates motion in the leftward direction after first pressing the corresponding key indicated in the first column ("KEY PRESSED"). For example, table 150 indicates that a user may select the alternate character "^" by first pressing the key "g" on keyboard 72 ("K1") and then swiping in the leftward direction, where the alternate character "^" is included in keyboard 76 ("K4").

Example table 150 of FIG. 9 shows various other examples of alternate characters that may be selected by a user by pressing an initial key of keyboard 72 ("K1") and then initiating motion with respect to a user interface (e.g., sliding a finger along a surface of a touch screen) in either the upward, downward, or leftward direction. The alternate character manager (e.g., alternate character manager 48 shown in FIG. 2) may utilize the mappings provided in table 150 to determine which alternate characters to display to a user after an initial key has been pressed on keyboard 72, and to further determine an alternate character selection based upon a subsequent movement in one of the upward, downward, or leftward directions. Of course, table 150 is shown for purposes of illustration only, and various other forms of mapping mechanisms could also be implemented to map user inputs to alternate character selections, including other forms of lookup tables.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

Various embodiments of the disclosure have been described. These and other embodiments are within the scope of the following claims.

The invention claimed is:

1. A non-transitory computer-readable storage medium encoded with instructions that, when executed, cause one or more processors of a mobile computing device to:

display, at a touchscreen, a first graphical keyboard comprising a plurality of keys that are associated with a first group of characters;

store information associated with a second graphical keyboard different from the first graphical keyboard, wherein the second graphical keyboard comprises a plurality of keys that are associated with a second group of characters, and wherein at least some of the second group of characters are not included in the first group of characters;

receive, at the touchscreen, initial user input specifying a selection of a key from the plurality of keys of the first graphical keyboard, wherein the initial user input comprises an initiation of a contact with the touchscreen, wherein the selected key is associated with a character of the first group of characters and is located at a first position within the first graphical keyboard;

in response to receiving the initial user input, display, at the touchscreen, a plurality of alternate characters, wherein each alternate character is displayed to indicate at least one corresponding selection direction that is associated with that alternate character, and wherein each of the plurality of alternate characters is not included in the first group of characters associated with the plurality of keys of the first graphical keyboard; and receive, at the touchscreen, additional user input specifying a selection of one of the plurality of alternate characters, wherein the additional user input comprises motion in the at least one corresponding selection direction that corresponds to the selected alternate character, and wherein the additional user input further comprises a release of the contact from the touchscreen, wherein the selected alternate character is included in the second group of characters associated with the plurality of keys of the second graphical keyboard, wherein the selected alternate character is associated with a key that is located at a second position within the second graphical keyboard, and wherein the first position of the selected key within the first graphical keyboard is comprises a same relative position in the first graphical keyboard as the second position of the key associated with the selected alternate character within the second graphical keyboard.

2. The computer-readable storage medium of claim 1, wherein the instructions to display the first graphical keyboard comprise instructions to display the plurality of keys of the first graphical keyboard such that each key of the plurality of keys of the first graphical keyboard is represented by only a single displayed character within the first graphical keyboard.

3. The computer-readable storage medium of claim 1, wherein the instructions to receive the initial user input and the instructions to receive the additional user input comprise instructions to receive user input provided by one continuous movement that maintains contact with the touchscreen.

4. The computer-readable storage medium of claim 1, wherein the instructions to display the plurality of alternate characters comprise instructions to display each of the plurality of alternate characters within a distinct graphical display unit.

5. The computer-readable storage medium of claim 4, wherein graphical arrows associated with the distinct graphical display units indicate the at least one corresponding selection direction associated with each of the plurality of alternate characters.

6. The computer-readable storage medium of claim 1, wherein positions of the plurality of alternate characters, with respect to the first position of the selected key within the first graphical keyboard, indicate the at least one corresponding selection direction associated with each of the plurality of alternate characters.

7. The computer-readable storage medium of claim 1, wherein graphical arrows associated with the plurality of alternate characters indicate the at least one corresponding selection direction associated with each of the plurality of alternate characters.

8. The computer-readable storage medium of claim 1, wherein the instructions to display the plurality of alternate characters comprise instructions to display the plurality of alternate characters after contact with the touchscreen from the initial user input has been maintained for a defined period of time.

9. The computer-readable storage medium of claim 1, further encoded with instructions to:
store information associated with a third graphical keyboard different from the first and second graphical keyboards, wherein the third graphical keyboard comprises a plurality of keys that are associated with a third group of characters, and wherein at least some of the third group of characters are not included in the first or second groups of characters,
wherein the third group of characters associated with the plurality of keys of the third graphical keyboard includes an alternate character that is different from the selected alternate character,
wherein the alternate character that is different from the selected alternate character is associated with a key that is located at a third position within the third graphical keyboard, and
wherein the first position of the selected key within the first graphical keyboard comprises the same relative position in the first graphical keyboard as the third position of the key associated with the alternate character within the third graphical keyboard.

10. The computer-readable storage medium of claim 1, wherein the additional user input comprises, with respect to the initial user input, at least one sliding movement across the touchscreen in the at least one corresponding selection direction that corresponds to the selected alternate character.

11. The computer-readable storage medium of claim 1, further encoded with instructions to:
remove the plurality of alternate characters from display at the touchscreen in response to receiving the additional user input.

12. The computer-readable storage medium of claim 1, wherein the additional user input comprises motion in a sequence of different selection directions corresponding to the selected alternate character.

13. The computer-readable storage medium of claim 1, wherein the additional user input comprises motion in different selection directions to specify selections of different alternate characters, wherein each of the different selection directions corresponds to one of the different alternate characters.

14. The computer-readable storage medium of claim 1, further encoded with instructions to:
display, at the touchscreen, the selected alternate character in a graphical character area that is separate and distinct from the first graphical keyboard; and
refrain from displaying, in the graphical character area, the character of the group of characters that is associated with the selected key.

15. A method comprising:
displaying a first graphical keyboard at a touchscreen of a mobile computing device, the first graphical keyboard comprising a plurality of keys that are associated with a first group of characters;
storing, by the mobile computing device, information associated with a second graphical keyboard different from the first graphical keyboard, wherein the second graphical keyboard comprises a plurality of keys that are associated with a second group of characters, and wherein at least some of the second group of characters are not included in the first group of characters;
receiving, by the mobile computing device at the touchscreen, initial user input specifying a selection of a key from the plurality of keys of the first graphical keyboard, wherein the initial user input comprises an initiation of a contact with the touchscreen, wherein the selected key is associated with a character of the first group of characters and is located at a first position within the first graphical keyboard;
responsive to receiving the initial user input, displaying a plurality of alternate characters at the touchscreen, wherein each alternate character is displayed to indicate at least one corresponding selection direction that is associated with that alternate character, and wherein each of the plurality of alternate characters is not included in the first group of characters associated with the plurality of keys of the first graphical keyboard; and
receiving, by the mobile computing device at the touchscreen, additional user input specifying a selection of one of the plurality of alternate characters, wherein the additional user input comprises motion in the at least one corresponding selection direction that corresponds to the selected alternate character, and wherein the additional user input further comprises a release of the contact from the touchscreen,
wherein the selected alternate character is included in the second group of characters associated with the plurality of keys of the second graphical keyboard,
wherein the selected alternate character is associated with a key that is located at a second position within the second graphical keyboard, and
wherein the first position of the selected key within the first graphical keyboard comprises a same relative position in the first graphical keyboard as the second position of the key associated with the selected alternate character within the second graphical keyboard.

16. A mobile computing device, comprising:
one or more processors;
a touchscreen; and
one or more storage devices,
wherein the one or more processors are configured to:
provide a first graphical keyboard that is displayed at the touchscreen, wherein the first graphical keyboard comprises a plurality of keys that are associated with a first group of characters;
provide a second graphical keyboard different from the first graphical keyboard, wherein information associated with the second graphical keyboard is stored in the one or more storage devices, wherein the second graphical keyboard comprises a plurality of keys that are associated with a second group of characters, and wherein at least some of the second group of characters are not included in the first group of characters;
receive data associated with initial user input specifying a selection of a key from the plurality of keys of the first graphical keyboard, wherein the initial user input comprises an initiation of a contact with the touchscreen, wherein the selected key is associated with a character of the first group of characters and is located at a first position within the first graphical keyboard;

in response to receiving the initial user input, provide a plurality of alternate characters that are displayed at the touchscreen, wherein each alternate character is displayed to indicate at least one corresponding selection direction that is associated with that alternate character, and wherein each of the plurality of alternate characters is not included in the first group of characters associated with the plurality of keys of the first graphical keyboard; and receive data associated with additional user input specifying a selection of one of the plurality of alternate characters, wherein the additional user input comprises motion across the touchscreen in the at least one corresponding selection direction that corresponds to the selected alternate character, and wherein the additional user input further comprises a release of the contact from the touchscreen, wherein the selected alternate character is included in the second group of characters associated with the plurality of keys of the second graphical keyboard, wherein the selected alternate character is associated with a key that is located at a second position within the second graphical keyboard, and wherein the first position of the selected key within the first graphical keyboard comprises a same relative position in the first graphical keyboard as the second position of the key associated with the selected alternate character within the second graphical keyboard.

17. The mobile computing device of claim 16, wherein the initial user input and the additional user input comprise user input provided by one continuous movement that maintains contact with the touchscreen.

18. The mobile computing device of claim 16, wherein each of the plurality of alternate characters is displayed within a distinct graphical display unit at the touchscreen.

19. The mobile computing device of claim 18, wherein graphical arrows associated with the distinct graphical display units indicate the at least one corresponding selection direction associated with each of the plurality of alternate characters.

20. The mobile computing device of claim 16, wherein positions of the plurality of alternate characters, with respect to the first position of the selected key within the first graphical keyboard, indicate the at least one corresponding selection direction associated with each of the alternate characters.

21. The mobile computing device of claim 16, wherein the plurality of alternate characters are displayed after contact with the touchscreen from the initial user input has been maintained for a defined period of time.

22. The mobile computing device of claim 16, wherein the additional user input comprises motion in a sequence of different selection directions corresponding to the selected alternate character.

23. The mobile computing device of claim 16, wherein the selected alternate character is displayed in a graphical character area that is separate and distinct from the first graphical keyboard, and wherein the character of the group of characters is associated with the selected key is not displayed in the graphical character area.

24. The mobile computing device of claim 16,
wherein the one or more processors are further configured to provide a third graphical keyboard different from the first and second graphical keyboards, the third graphical keyboard comprising a plurality of keys that are associated with a third group of characters not included in the first or second groups of characters, wherein the third group of characters associated with the plurality of keys of the third graphical keyboard includes an alternate character that is different from the selected alternate character, wherein the alternate character that is different from the selected alternate character is associated with a key that is located at a third position within the third graphical keyboard, and wherein the first position of the selected key within the first graphical keyboard comprises the same relative position in the first graphical keyboard as the third position of the key associated with the alternate character within the third graphical keyboard.

25. The mobile computing device of claim 16, wherein the additional user input comprises motion in different selection directions to specify selections of different alternate characters, wherein each of the different selection directions corresponds to one of the different alternate characters.

* * * * *

UNITED STATES PATENT AND TRADEMARK OFFICE
CERTIFICATE OF CORRECTION

| | | |
|---|---|---|
| PATENT NO. | : 8,612,878 B2 | Page 1 of 1 |
| APPLICATION NO. | : 13/250120 | |
| DATED | : December 17, 2013 | |
| INVENTOR(S) | : Eric Zhang | |

It is certified that error appears in the above-identified patent and that said Letters Patent is hereby corrected as shown below:

In the Claims

Claim 1, column 18, line 37: "graphical keyboard is comprises a same relative position" should be changed to -- graphical keyboard comprises a same relative position --

Signed and Sealed this
Twenty-fourth Day of June, 2014

Michelle K. Lee
*Deputy Director of the United States Patent and Trademark Office*